(No Model.)

E. O. RABON.
CULINARY UTENSIL.

No. 546,554. Patented Sept. 17, 1895.

WITNESSES:
Edward C. Rowland
J. B. Saplinger

INVENTOR
E. O. Rabon
BY Munn & Co
ATTORNEYS.

UNITED STATES PATENT OFFICE.

EDWARD OSBORN RABON, OF PHILADELPHIA, PENNSYLVANIA.

CULINARY UTENSIL.

SPECIFICATION forming part of Letters Patent No. 546,554, dated September 17, 1895.

Application filed May 16, 1895. Serial No. 549,436. (No model.)

*To all whom it may concern:*

Be it known that I, EDWARD OSBORN RABON, of Philadelphia, in the county of Philadelphia and State of Pennsylvania, have invented a new and Improved Culinary Utensil, of which the following is a full, clear, and exact description.

This invention relates to culinary utensils, and more especially to that class of utensils which are employed for pouring batter on a griddle in making batter-cakes and the like, and the object of the invention is to provide a simple and inexpensive device for this purpose, which shall be of a better and more convenient nature for use in making batter cakes and for similar purposes than other devices heretofore employed.

The invention comprises a vessel adapted to contain the batter ready for use, having a handle at its upper part, and provided at its lower part with an outlet controlled by a valve actuated by a lever arranged adjacent to the said handle, whereby the device is made at once simple and convenient of operation with a minimum movement of the hand of the operator.

The invention also contemplates certain novel features of construction and combinations of parts, whereby certain important advantages are attained, all as will be hereinafter fully set forth.

The novel features of the invention will be carefully defined in the claim.

In order that my invention may be the better understood, I have illustrated in the accompanying drawings a utensil provided with my improvement, in which—

Figure 1:
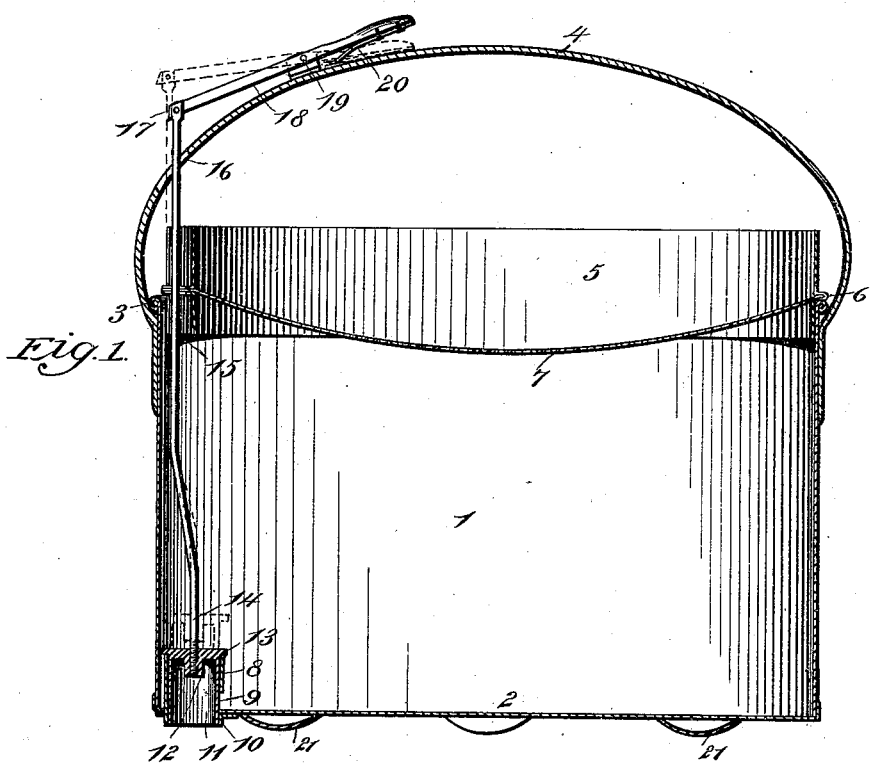
Figure 2:
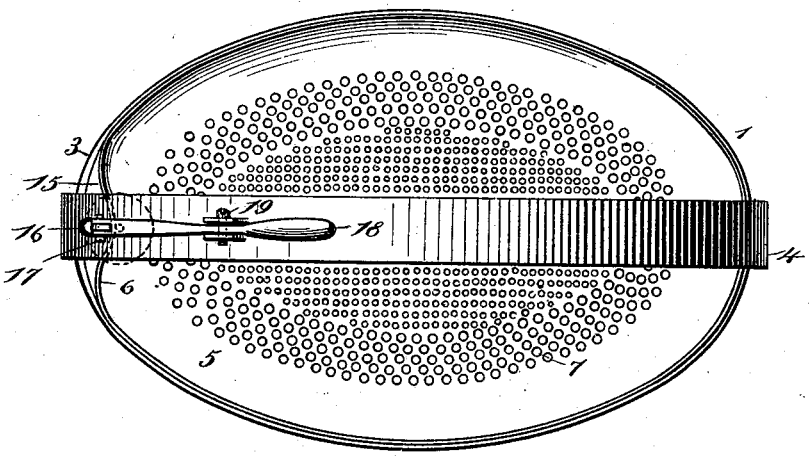

Figure 1 is a vertical section taken longitudinally through the utensil, and Fig. 2 is a plan view of the utensil.

Similar characters of reference indicate corresponding parts in both views.

1 represents the body of the utensil, which will usually be constructed of sheet metal of any preferred form and dimensions. As herein shown, the body is of a general elliptical form, provided with a flat bottom 2 and having its upper edge wired, as clearly seen at 3 in the drawings, and is provided with a handle 4, consisting of a metal strip or band bent to a curved form and having its extremities secured by means of solder or otherwise to the opposite ends of the body 1.

The top of the body or vessel 1 is open and is adapted to be closed by means of a removable section 5, corresponding in general form to the form of the open mouth of said vessel 1, into which its lower part is adapted to fit, and the said section 5 is provided around its edge with a projecting bead or flange 6, formed by a bend or lap in the metal of which said section is composed, and adapted to engage and rest on the wired rim 3 of the vessel 1 when said section is in place.

The section 5 is provided with a bottom 7, which is bent down or concaved on its upper side and provided with perforations, so as to be adapted to serve as a strainer, and the said bottom is secured in place by being held at its edge in the lap of the metal forming the bead or flange 6, as clearly seen in Fig. 1.

At the lower part of the body or vessel 1 a valve-chamber 8 is provided, being located interiorly thereof and provided with an opening 9 in its side, and the lower end of said chamber 8 is carried down, as indicated at 10, below the bottom of the vessel or body 1, and is open and adapted to serve as an outlet or discharge-opening for the batter or other material contained in the vessel. In it is arranged to move a valve 11, having a projecting annular flange 13 at its top adapted to engage the upper edge of the casing 8, and provided with a central interiorly screw-threaded socket 12 to receive the threaded lower end of a valve-stem 14, the upper end of which is bent over toward one end of the vessel 1 and carried upward through an opening 15, formed by an inward bend in the end of the strainer-section 5. The upper end of the valve-stem 14 extends through an opening 16, suitably formed in the handle 14, and is loosely connected, as seen at 17, to one end of a lever 18, pivoted at 19, between lugs projecting from the upper side of the handle 4, and provided with a spring 20, whereby the valve 11 is normally held in a depressed position, so as to close the inlet 9 of the casing 8.

The under side of the body or vessel 1 is provided with feet 21, suitably formed thereon and adapted to hold said vessel at such a distance from its supporting-surface that the projecting open end 10 of the outlet will be held out of contact with the supporting-surface. The valve-stem 14 is so arranged that when the valve is in its lowered position said stem will be moved far inwardly and engaged with the recess 15 in the cover 5 in such a way as to prevent the removal of the said cover. When, however, the valve-stem is raised to the position shown by dotted lines in Fig. 1, the said stem will be moved outwardly for a distance sufficient to permit the cover 5 to be removed from the body of the vessel, and this removal may be readily effected by swinging the cover off in a slightly-diagonal line, so that the end having the recess 15 will be disengaged from the stem after the opposite end has been disengaged from the corresponding part of the body 1.

In operation, when it is desired to pour the batter, &c., on the griddle in making batter-cakes or the like, the vessel is taken up by its handle and the thumb-piece of the lever 18 depressed in such a way as to open the valved outlet and permit the batter to fall on the griddle, said outlet being immediately closed by the removal of the pressure on said lever.

The parts are so arranged that the device is adapted for convenient operation, and it will be understood that the vessel is not limited for use in making batter-cakes and the like, but may be employed to hold oil, sirup, or other liquid. The strainer-section 5 is also very convenient, since it serves to strain the liquid thoroughly as the vessel is filled.

The device, as above described, is of an exceedingly simple and inexpensive construction and is well adapted for the purposes for which it is intended; but it will be understood that some modification may be made therein without material departure from the spirit of my invention, and I do not, therefore, wish to be understood as limiting myself to the exact construction of the device as herein set forth.

Having thus described my invention, I claim as new and desire to secure by Letters Patent—

A culinary utensil having a rigid handle and having an opening in its bottom, a valve commanding said opening, a valve stem connected to the valve and passed upwardly to a lever fulcrumed on the handle and pivoted to the valve stem, and a cover, the same having adjacent to the valve stem a depression which receives said stem, the lever having a normally inclined position so that the stem may be moved upwardly and outwardly and so that the cover can be withdrawn only when the stem is thus moved, substantially as described.

EDWARD OSBORN RABON.

Witnesses:
SAMUEL G. NIXON,
EDWARD BURKATZSKI.